US012700952B2

(12) United States Patent | (10) Patent No.: US 12,700,952 B2
Fu | (45) Date of Patent: Aug. 4, 2026

(54) METHOD AND APPARATUS FOR DETERMINING OR DECODING HARQ-ACK CODEBOOK, AND STORAGE MEDIUM

(71) Applicant: Beijing Xiaomi Mobile Software Co., Ltd., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 235 days.

(21) Appl. No.: 18/705,960

(22) PCT Filed: Nov. 1, 2021

(86) PCT No.: PCT/CN2021/128010
§ 371 (c)(1),
(2) Date: Apr. 29, 2024

(87) PCT Pub. No.: WO2023/070687
PCT Pub. Date: May 4, 2023

(65) Prior Publication Data
US 2025/0132865 A1 Apr. 24, 2025

(51) Int. Cl.
*H04L 1/1812* (2023.01)
*H04L 5/00* (2006.01)
*H04W 72/1273* (2023.01)

(52) U.S. Cl.
CPC .......... *H04L 1/1812* (2013.01); *H04L 5/0055* (2013.01); *H04W 72/1273* (2013.01)

(58) Field of Classification Search
CPC . H04L 1/1812; H04L 5/0055; H04W 72/1273
See application file for complete search history.

(56) References Cited

U.S. PATENT DOCUMENTS

2022/0346104 A1* 10/2022 Yi .......................... H04L 1/1854
2023/0129120 A1* 4/2023 MolavianJazi ....... H04L 1/1896
370/329
2023/0413097 A1* 12/2023 Lin ....................... H04L 1/1864

FOREIGN PATENT DOCUMENTS

CN 110034868 A 7/2019
CN 110166206 A 8/2019
CN 112398631 A 2/2021
CN 112737738 A 4/2021
(Continued)

OTHER PUBLICATIONS

Liang, D., "Design of Off-digital Baseband Processor Transmitter for TD-LTE Terminals," Master's Dissertation, University of Electronic Science and Technology of China, 2011, 89 pages. (English Abstract Included).
(Continued)

*Primary Examiner* — Siren Wei
(74) *Attorney, Agent, or Firm* — McCoy Russell LLP

(57) ABSTRACT

A method for determining or decoding a HARQ-ACK codebook, includes: determining a second K1 set in a second scheduling method based on a first K1 set in a first scheduling method, a K0 set in the second scheduling method, and an HARQ feedback bundling value N; and determining the HARQ-ACK codebook based on the second K1 set; in the first scheduling method, one piece of downlink control information (DCI) schedules one PDSCH; and in the second scheduling method, one piece of DCI schedules a plurality of PDSCHs.

20 Claims, 5 Drawing Sheets

(56)                    References Cited

FOREIGN PATENT DOCUMENTS

| | | | |
|---|---|---|---|
| CN | 113424474 | A | 9/2021 |
| WO | 2020200162 | A1 | 10/2020 |
| WO | 2021100982 | A1 | 5/2021 |

OTHER PUBLICATIONS

"Corrections on HARQ Feedback," Proceedings of the 3GPP TSG RAN WG1 #AH 1801, Samsung, R1-1800453, Jan. 22, 2018, Vancouver, Canada, 9 pages.

"Remaining aspects of NR CA," Proceedings of the 3GPP TSG RAN WG1 Meeting AH 1801, Nokia, Nokia Shanghai Bell, R1-1800745, Jan. 22, 2018, Vancouver, Canada, 6 pages.

"PDSCH/PUSCH enhancements," Proceedings of the 3GPP TSG-RAN WG1 Meeting #106-e, Ericsson, R1-2107054, Aug. 16, 2021, e-Meeting, 61 pages.

* cited by examiner

Network device
102

User equipment
101

S21 transmit second configuration
information

S22 determine a second K1 set in
the second scheduling method

S23 determine an HARQ-ACK codebook
based on the second K1 set

S24 determine a feedback window for
the HARQ-ACK codebook based on
the second K1 set

S25 feed back the HARQ-ACK codebook
based on the feedback window

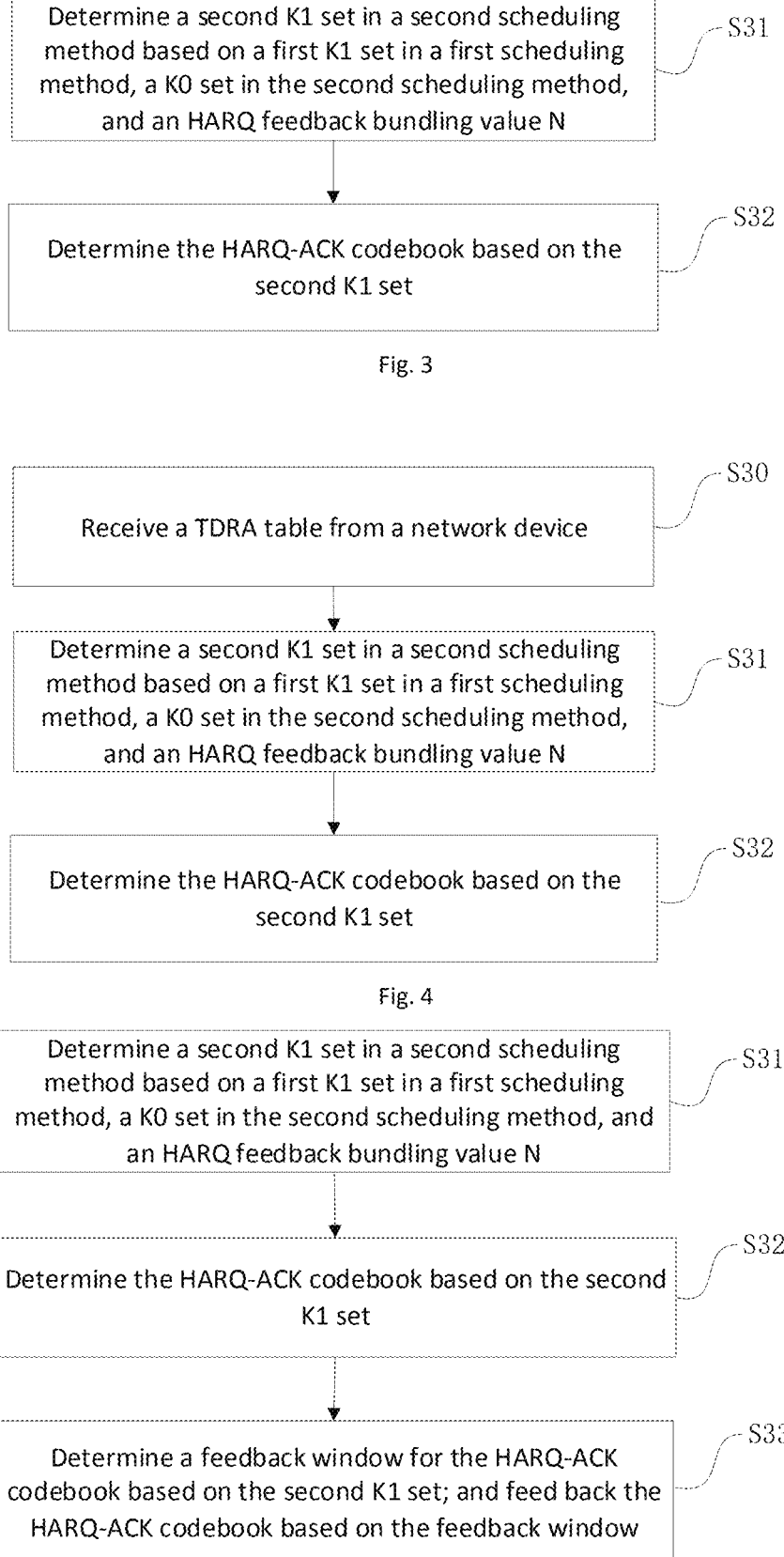

Determine a second K1 set in a second scheduling method based on a first K1 set in a first scheduling method, a K0 set in the second scheduling method, and an HARQ feedback bundling value N — S31

Determine the HARQ-ACK codebook based on the second K1 set — S32

Fig. 3

Receive a TDRA table from a network device — S30

Determine a second K1 set in a second scheduling method based on a first K1 set in a first scheduling method, a K0 set in the second scheduling method, and an HARQ feedback bundling value N — S31

Determine the HARQ-ACK codebook based on the second K1 set — S32

Fig. 4

Determine a second K1 set in a second scheduling method based on a first K1 set in a first scheduling method, a K0 set in the second scheduling method, and an HARQ feedback bundling value N — S31

Determine the HARQ-ACK codebook based on the second K1 set — S32

Determine a feedback window for the HARQ-ACK codebook based on the second K1 set; and feed back the HARQ-ACK codebook based on the feedback window — S33

Fig. 5

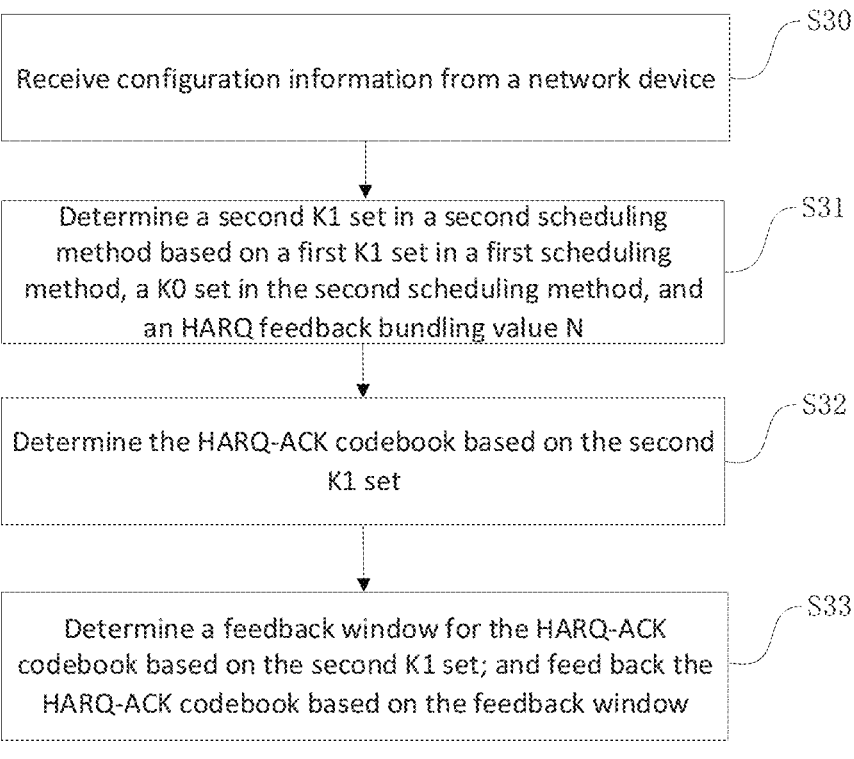

S30

Receive configuration information from a network device

S31

Determine a second K1 set in a second scheduling method based on a first K1 set in a first scheduling method, a K0 set in the second scheduling method, and an HARQ feedback bundling value N

S32

Determine the HARQ-ACK codebook based on the second K1 set

S33

Determine a feedback window for the HARQ-ACK codebook based on the second K1 set; and feed back the HARQ-ACK codebook based on the feedback window

Processing module

Transceiver module

METHOD AND APPARATUS FOR DETERMINING OR DECODING HARQ-ACK CODEBOOK, AND STORAGE MEDIUM

CROSS-REFERENCE TO RELATED APPLICATIONS

The present application is a U.S. National Stage of International Application No. PCT/CN2021/128010, entitled "METHOD AND APPARATUS FOR DETERMINING OR DECODING HARQ-ACK CODEBOOK, AND STORAGE MEDIUM", filed on Nov. 1, 2021, the contents of all of which are incorporated herein by reference in their entireties for all purposes.

BACKGROUND OF THE INVENTION

A Type 1 codebook is a HARQ-ACK feedback method with a size-fixed HARQ-ACK codebook. On an HARQ-ACK physical uplink control channel (PUCCH), it is required to feed back HARQ-ACKs of effective candidate physical downlink shared channels (PDSCHs) on all slots in a size-fixed feedback window.

SUMMARY OF THE INVENTION

In view of this, the disclosure provides a method for determining a HARQ-ACK codebook, an apparatus, and a readable storage medium.

In a first aspect, a method for determining an HARQ-ACK codebook is provided. The method is performed by user equipment and includes: determining a second K1 set in a second scheduling method based on a first K1 set in a first scheduling method, a K0 set in the second scheduling method, and an HARQ feedback bundling value N; and determining the HARQ-ACK codebook based on the second K1 set. A k1 value in the first K1 set is configured to indicate a number of time units offset from a time unit in which a physical downlink shared channel (PDSCH) is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located. In the first scheduling method, one piece of downlink control information (DCI) schedules one PDSCH. In the second scheduling method, one piece of DCI schedules a plurality of PDSCHs.

In a second aspect, a method for determining a hybrid automatic repeat request acknowledgement (HARQ-ACK) codebook is provided. The method is performed by a network device and includes: transmitting second configuration information to user equipment, where the second configuration information includes information configured to indicate a K0 set in a second scheduling method; determining a second K1 set in the second scheduling method based on a first K1 set in a first scheduling method, the K0 set in the second scheduling method, and an HARQ feedback bundling value N; and determining the HARQ-ACK codebook based on the second K1 set. A k1 value in the first K1 set is configured to indicate a number of time units offset from a time unit in which a PDSCH is located to a time unit in which an uplink channel of an HARQ-ACK corresponding to the PDSCH is located. A K0 value in the K0 set is configured to indicate a number of time units offset from a time unit in which the PDSCH is located to a time unit in which an uplink control channel corresponding to the PDSCH is located. In the first scheduling method, one piece of DCI schedules one PDSCH. In the second scheduling method, one piece of DCI schedules a plurality of PDSCHs.

In a second aspect, a method for decoding a HARQ-ACK codebook is further provided. The method is performed by a network device and includes: receiving the HARQ-ACK codebook from user equipment; determining a second K1 set in a second scheduling method based on a first K1 set in a first scheduling method, a K0 set in the second scheduling method, and an HARQ feedback bundling value N; and decoding the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A K0 value in the K0 set is configured to indicate a number of time units offset from a time unit in which the PDSCH is located to a time unit in which an uplink control channel corresponding to the PDSCH is located. In the first scheduling method, one piece of DCI schedules one PDSCH. In the second scheduling method, one piece of DCI schedules a plurality of PDSCHs.

In a third aspect, a communication apparatus is provided. The communication apparatus includes one or more processors and a memory. The memory is configured to store a computer program. The one or more processors are collectively configured to execute the computer program, so as to implement a design of the first aspect.

In a fourth aspect, a communication apparatus is provided. The communication apparatus includes one or more processors and a memory. The memory is configured to store a computer program. The one or more processors are collectively configured to execute the computer program, so as to implement the second aspect or any possible design of the second aspect.

In a fifth aspect, a non-transitory computer-readable storage medium is provided. The non-transitory computer-readable storage medium stores an instruction (or referred to as a computer program, or a program). The instruction causes a computer to execute a design of the first aspect when called to be executed on the computer.

In an sixth aspect, a non-transitory computer-readable storage medium is provided. The non-transitory computer-readable storage medium stores an instruction (or referred to as a computer program or a program). The instruction causes a computer to execute the above second aspect or any possible design of the second aspect when called to be executed on the computer.

It should be understood that the above general descriptions and the following detailed descriptions are illustrative and explanatory merely, and cannot limit the disclosure.

BRIEF DESCRIPTION OF DRAWINGS

Accompanying drawings described here serve as a constituent part of the disclosure to provide a further understanding of examples of the disclosure. The examples of the disclosure and their descriptions serve to explain the disclosure, and are not to be construed as unduly limiting the examples of the disclosure. In the accompanying drawings, accompanying drawings here are incorporated into the description as a constituent part of the description, illustrate examples conforming to the disclosure, and serve to explain principles of the examples of the disclosure along with the description.

FIG. 3 is a flow diagram of another method for feeding back an HARQ-ACK codebook according to an example;

FIG. 4 is a flow diagram of yet another method for feeding back an HARQ-ACK codebook according to an example;

FIG. 5 is a flow diagram of yet another method for feeding back an HARQ-ACK codebook according to an example;

FIG. 6 is a flow diagram of still another method for feeding back an HARQ-ACK codebook according to an example;

FIG. 7 is a structural diagram of an apparatus for feeding back an HARQ-ACK codebook according to an example;

DETAILED DESCRIPTION OF THE INVENTION

Examples of the disclosure will be further described in combination with accompanying drawings and particular embodiments.

Examples will be described in detail here and shown in accompanying drawings illustratively. When the following descriptions relate to accompanying drawings, unless otherwise specified, the same numeral in different accompanying drawings denotes the same or similar elements. The embodiments described in the following examples do not denote all embodiments consistent with examples of the disclosure. On the contrary, the embodiments are merely instances of apparatuses and methods consistent with some aspects of the disclosure as detailed in the appended claims.

The disclosure relates to the technical field of wireless communication, and particularly relates to a method for determining or decoding a hybrid automatic repeat request acknowledgement (HARQ-ACK) codebook, an apparatus, and a readable storage medium.

A Type 1 codebook is a HARQ-ACK feedback method with a size-fixed HARQ-ACK codebook. On an HARQ-ACK PUCCH, it is required to feed back HARQ-ACKs of effective candidate PDSCHs on all slots in a size-fixed feedback window.

In new radio (NR) 52.6 GHz-71 GHz, a scenario of scheduling multiple PDSCH slots through a physical downlink control channel (PDCCH), that is, a multi-slot PDSCH scheduling scenario, will be introduced. Since multi-slot PDSCH scheduling is introduced, if the feedback window for the Type 1 codebook is determined only according to a K1 set in a single-slot scheduling scenario, the Type 1 codebook cannot completely contain slots in which all PDSCHs scheduled by DCI are located.

An HARQ-ACK bundling feedback method is provided for multi-slot PDSCH scheduling. That is, N1 PDSCHs scheduled by one piece of DCI is required to feed back N2 pieces of HARQ-ACK information after HARQ-ACK bundling, instead of original N1 pieces of HARQ-ACK information, and N2<N1.

How to determine the K1 set of the Type 1 codebook under the circumstance that the HARQ-ACK bundling feedback method is used is a technical problem to be solved.

Figures 1, 2:
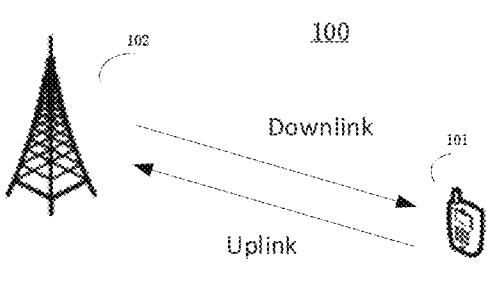
FIG. 1 is a structural diagram of a wireless communication system according to an example.
FIG. 2 is a flow diagram of a method for feeding back a HARQ-ACK codebook according to an example.

As shown in FIG. 1, a schematic diagram of a communication system according to an example is shown in FIG. 1. A method for determining an HARQ-ACK codebook provided in an example of the disclosure may be applied to a wireless communication system 100. The wireless communication system may include user equipment 101 and a network device 102. The user equipment 101 is configured to support carrier aggregation. The user equipment 101 may be connected to a plurality of carrier units of the network device 102, which include one primary carrier unit and one or more secondary carrier units.

It should be understood that the above wireless communication system 100 may be applicable to both a low-frequency scenario and a high-frequency scenario. Application scenarios of the wireless communication system 100 include but are not limited to a long term evolution (LTE) system, an LTE frequency division duplex (FDD) system, an LTE time division duplex (TDD) system, a worldwide interoperability for micro wave access (WiMAX) communication system, a cloud wireless access network (CRAN) system, a future 5th-generation (5G) system, a new radio (NR) communication system, or a future evolved public land mobile network (PLMN) system, etc.

The user equipment (UE) 101 shown above may be a terminal, an access terminal, a terminal unit, a terminal station, a mobile station (MS), a remote station, a remote terminal, a mobile terminal, a wireless communication device, a terminal proxy, or user equipment, etc. The user equipment 101 may have a wireless transceiver function, may be in communication (such as wireless communication) with one or more network devices of one or more communication systems, and may receive a network service provided by the network device. The network device includes but is not limited to the network device 102 shown in the figure.

The user equipment 101 may be a cellular telephone, a cordless telephone, a session initiation protocol (SIP), a wireless local loop wireless local loop (WLL) station, a personal digital assistant (PDA) device, a handheld device having a wireless communication capability, a computing device or other processing devices connected to a wireless modem, an in-vehicle device, a wearable device, user equipment in a future 5G network or user equipment in a future evolved PLMN network, etc.

The network device 102 may be an access network device (or referred to as an access network site). The access network device refers to a device that provides a network access function, such as a radio access network (RAN) base station. The network device 102 may specifically include a base station (BS), or include a base station and a radio resource management device configured to control a base station. The network device 102 may further include a relay station (relay device), an access point, a base station in the future 5G network, a base station in the future evolved PLMN network, or a NR base station, etc. The network device 102 may be a wearable device or an in-vehicle device. The network device 102 may also be a communication chip having a communication module.

For instance, the network device 102 includes but is not limited to a gnodeB (gNB) in 5G, an evolved node B (CNB) in an LTE system, a radio network controller (RNC), a node B (NB) in a wideband code division multiple access (WCDMA) system, a radio controller in a CRAN system, a basestation controller (BSC), a base transceiver station

(BTS) in a global system for mobile communications (GSM) system or a CDMA system, home base station (such as a home evolved node B or a home node B (HNB)), a baseband unit (BBU), a transmitting and receiving point (TRP), a transmitting point (TP), or a mobile switching center.

In a multi-slot PDSCH scheduling scenario, HARQ-ACKs of a plurality of PDSCHs scheduled by one piece of DCI are fed back in the same physical uplink control channel (PUCCH). A slot of the PUCCH for feeding back the HARQ-ACKs of the plurality of PDSCHs is determined according to k1 in the scheduling DCI and a slot position of the last PDSCH. However, since multi-slot PDSCH scheduling is introduced, if a feedback window for a Type 1 codebook is determined only according to a K1 set in a single-slot scheduling scenario, the Type 1 codebook may not completely contain slots in which all PDSCHs scheduled by the DCI are located.

In a case that multi-transmission-time-interval (TTI) PDSCH scheduling and a HARQ-ACK bundling feedback method are used simultaneously, it may not be ensured that no matter which k1 value the scheduling DCI indicates from the configured K1 set, the plurality of PDSCHs scheduled by the DCI can feed back a Type 1 HARQ-ACK codebook on one HARQ-ACK PUCCH resource.

An example of the disclosure provides a method for determining an extension K1 set of a Type 1 HARQ-ACK codebook for multi-TTI PDSCH scheduling and a HARQ-ACK bundling feedback method. According to the method, it can be ensured in a case of the HARQ-ACK bundling feedback method that no matter which k1 value scheduling DCI indicates from a configured K1 set, a plurality of PDSCHs scheduled by the DCI can feed back a minimum extension K1 set (that is, an extension K1 set including fewest k1 values) of a Type 1 HARQ-ACK codebook on one HARQ-ACK PUCCH resource.

An example of the disclosure provides a method for feeding back an HARQ-ACK codebook. The method is applied to a communication system 100. With reference to FIG. 2, a flow diagram of a method for determining an HARQ-ACK codebook according to an example is shown in FIG. 2. The method includes steps 21 through 25.

S21: Transmit second configuration information to user equipment by a network device 102. The second configuration information includes information configured to indicate a K0 set in a second scheduling method.

S22: Determine a second K1 set by the user equipment 101 in the second scheduling method based on a first K1 set in a first scheduling method, a K0 set in the second scheduling method, and an HARQ feedback bundling value N.

S23: Determine the HARQ-ACK codebook by the user equipment 101 based on the second K1 set.

S24: Determine a feedback window for the HARQ-ACK codebook by the user equipment 101 based on the second K1 set.

S25: Feed back the HARQ-ACK codebook by the user equipment 101 based on the feedback window.

In the above steps:

A k1 value in the first K1 set is configured to indicate a number of time units offset from a time unit in which a PDSCH is located to a time unit in which an uplink channel of an HARQ-ACK corresponding to the PDSCH is located.

A k0 value in the K0 set is configured to indicate a number of time units offset from a time unit in which the PDSCH is located to a time unit in which an uplink control channel corresponding to the PDSCH is located.

6

In the first scheduling method, one piece of DCI schedules one PDSCH. In the second scheduling method, one piece of DCI schedules a plurality of PDSCHs.

In an example of the disclosure, it can be ensured that no matter which k1 value scheduling DCI indicates from a configured K1 set, a plurality of PDSCHs scheduled by the DCI can feed back a minimum extension K1 set (that is, an extension K1 set including fewest k1 values) of a Type 1 HARQ-ACK codebook on one HARQ-ACK PUCCH resource.

An example of the disclosure provides a method for determining an HARQ-ACK codebook. The method is performed by user equipment 101. With reference to FIG. 3, a flow diagram of a method for determining an HARQ-ACK codebook according to an example is shown in FIG. 3. As shown in FIG. 3, the method include steps 31 and 32.

S31: Determine a second K1 set in a second scheduling method based on a first K1 set in a first scheduling method, a K0 set in the second scheduling method, and an HARQ feedback bundling value N.

S32: Determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

In a possible embodiment, the method further includes: receive first configuration information from the network device. The first configuration information includes information configured to indicate the first K1 set in the first scheduling method.

In a possible embodiment, the method further includes: determine the first K1 set in the first scheduling method based on a communication protocol.

In a possible embodiment, the method further includes: receive second configuration information from the network device. The second configuration information includes information configured to indicate the K0 set in the second scheduling method. In an instance, the second configuration information includes a time domain resource allocation (TDRA) table, and the TDRA table includes the K0 set in the second scheduling method.

In a possible embodiment, the method further includes: receive third configuration information from the network device, where the third configuration information includes information configured to indicate the HARQ feedback bundling value N, or determine HARQ feedback bundling value N based on a communication protocol.

In an example of the disclosure, it can be ensured that no matter which k1 value scheduling DCI indicates from a configured K1 set, a plurality of PDSCHs scheduled by the DCI can feed back a minimum extension K1 set (that is, an extension K1 set including fewest k1 values) of a Type 1 HARQ-ACK codebook on one HARQ-ACK PUCCH resource.

An example of the disclosure provides a method for determining an HARQ-ACK codebook. The method is performed by user equipment 101. The method includes:

S31: Determine a second K1 set in a second scheduling method based on a first K1 set in a first scheduling method, a K0 set in the second scheduling method, and an HARQ feedback bundling value N.

S32: Determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located.

A k0 value in the K0 set is configured to indicate a number of time units offset from a time unit in which the PDSCH is located to a time unit in which an uplink control channel corresponding to the PDSCH is located. The K0 set includes at least one K0 subset, each K0 subset includes one or more k0 values, and each k0 value corresponds to a time interval in the second scheduling method between a time unit in which a plurality of PDSCHs scheduled by one piece of DCI are located and a time unit in which the DCI is located.

In the first scheduling method, one piece of DCI schedules one PDSCH. In the second scheduling method, one piece of DCI schedules a plurality of PDSCHs.

An example of the disclosure provides a method for determining an HARQ-ACK codebook. The method is performed by user equipment 101. With reference to FIG. 4, a flow diagram of a method for determining an HARQ-ACK codebook according to an example is shown in FIG. 4. As shown in FIG. 4, the method includes steps 30 through 32.

S30: Receive a time domain resource allocation (TDRA) table from a network device.

S31: Determine a second K1 set in a second scheduling method based on a first K1 set in a first scheduling method, a K0 set in the second scheduling method, and an HARQ feedback bundling value N.

S32: Determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located.

A k0 value in the K0 set is configured to indicate a number of time units offset from a time unit in which the PDSCH is located to a time unit in which an uplink control channel corresponding to the PDSCH is located. The K0 set includes at least one K0 subset, and the K0 subset is a set of k0 values included by an rth element of elements including a plurality of k0 values in the TDRA table.

In the first scheduling method, one piece of DCI schedules one PDSCH. In the second scheduling method, one piece of DCI schedules a plurality of PDSCHs.

In a possible embodiment, a TDRA table is shown in Table 1.

TABLE 1

| | | TDRA table | | | |
|---|---|---|---|---|---|
| Row index | DMRS Type A position | Mapping type of PDSCH | k0 | S | L |
| 1 | 2 | Type A | 0 | 2 | 6 |
| 2 | 3 | Type A, Type A, Type B, Type B, | 0, 1, 1, 2 | 3, 3, 8, 11 | 11, 9, 4, 2 |
| 3 | 2 | Type A, Type A, Type A, Type B, Type B, Type B, Type B, Type B | 1, 2, 3, 4, 5, 6, 7, 8 | 3, 3, 3, 6, 6, 6, 8, 8 | 11, 11, 11, 8, 8, 8, 4, 4 |

TABLE 1-continued

| | | TDRA table | | | |
|---|---|---|---|---|---|
| Row index | DMRS Type A position | Mapping type of PDSCH | k0 | S | L |
| 4 | 3 | Type A | 0 | 3 | 6 |
| 5 | 2 | Type B | 0 | 4 | 4 |

DMRS represents a demodulation reference signal.

Each row of the TDRA table corresponds to a time domain resource scheduling method, and time domain resource scheduling methods identified by row indexes 2 and 3 each correspond to a plurality of k0 values, such that row indexes 2 and 3 correspond to (0, 1, 1, 2) and (1, 2, 3, 4, 5, 6, 7, 8) respectively. In this case, the K0 set in the second scheduling method includes (0, 1, 1, 2) and (1, 2, 3, 4, 5, 6, 7, 8).

It can be understood that each element in Table 1 independently exists. These elements are illustratively listed in the same table, which however does not mean that all elements in the table certainly simultaneously exist as shown in the table. A value of each element is independent of a value of any other element in Table 1. Thus, those skilled in the art can understand that the value of each element in Table 1 is an independent example.

An example of the disclosure provides a method for determining an HARQ-ACK codebook. The method is performed by user equipment 101. The method includes:

S30: Receive a time domain resource allocation (TDRA) table from a network device.

S31a: Determine a second K1 set based on formula (1) as follows:

$$\{K1'\} = \{K1\} \cup \{k1_i + k0_{r,m} - \min\{S_r\}\}_{i=0,r=0,m=0}^{i=L-1,r=R-1,m=T_r-1}. \quad (1)$$

$\{K1'\}$ is the second K1 set, $\{K1\}$ is the first K1 set, $k1_i$ is an ith k1 value included in first K1 set $\{K1\}$, $k0_{r,m}$ is an mth k0 value in $\{S_r\}$, $\{S_r\}$ is a subset of $\{P_r\}$, $\{P_r\}$ is a set of k0 values included in the rth element of the elements including the plurality of k0 values in the TDRA table, $T_r$ is a number of k0 values included in $\{S_r\}$, a value of $T_r$ is a minimum value of $M_r$ and N. $M_r$ is a number of k0 values included in $\{P_r\}$, $\min\{S_r\}$ is a minimum k0 value in $\{S_r\}$, and $\cup$ represents computation of a union set.

S32: Determine the HARQ-ACK codebook based on the second K1 set.

An example of the disclosure provides a method for determining an HARQ-ACK codebook. The method is performed by user equipment 101. The method includes:

S30: Receive a time domain resource allocation (TDRA) table from a network device.

S31b: Determine a third K1 set as the first K1 set, a value of i as 0, a value of r as 0 and a value of m as 0, execute an incremental loop based on i, r and m cyclically, and take the third K1 set as the second K1 set after loop end conditions are satisfied.

Contents executed in the incremental loop based on i, r and m include: determine a union set of the third K1 set and a combination value, and determine the union set as the third K1 set.

The combination value is $k1_i + k0_{r,m} - \min\{S_r\}$; $\{S_r\}$ is a subset of $\{P_r\}$, $\{P_r\}$ is the set of k0 values included in the rth element of the elements including the plurality of k0 values in the TDRA table, $T_r$ is the number of k0 values included in $\{S_r\}$, the value of $T_r$ is the minimum value of $M_r$ and N, $M_r$ is the number of k0 values included in $\{P_r\}$; and $\min\{S_r\}$ is the minimum k0 value in $\{S_r\}$.

The loop end conditions are that the value of i is L−1, the value of r is R−1, and the value of m is $T_r$−1; the loop end conditions are that the value of i reaches L−1, the value of r reaches R−1, and the value of m reaches $T_r$; and L is a number of k1 values included in the first K1 set, and R is a number of elements including a plurality of k0 values in the TDRA table.

S32: Determine the HARQ-ACK codebook based on the second K1 set.

In a possible embodiment, S31b corresponds to an execution code as follows:

```
                    {K1'}={K1}
        initialize
        for i=0: L−1
          for r=0: R−1
            for m=0: min{Mr−1, N−1}
                {K1'}={K1'}∪k1i + k0r,m −min{Sr}
              end
          end
        end
```

Detailed descriptions will be provided below through two instances.

Instance 1:

Number N of HARQ-ACK bundle is 2.

K1 set=$\{1, 2, 3\}$.

There are a total of 2 TDRA elements including a plurality of k0 values in the TDRA table. A first TDRA element includes 4 k0 values, and corresponds to set $P_1=\{0, 1, 2, 3\}$. A second TDRA element includes 8 k0 values, and correspond to set $P_2=\{1, 2, 3, 4, 5, 6, 7, 8\}$.

It is determined that L=3, R=2, $M_1$=4, $M_2$=8, and N=2 according to the above preconditions.

A subset is selected first for a TDRA element including a plurality of k0 values.

A number of k0 values included in set $P_1$ corresponding to the first TDRA element is 4, which is greater than N, that is, greater than 2, such that 2 maximum k0 values are selected from $P_1$, and new set S=$\{2, 3\}$ is determined. A minimum value in $S_1$ is 2, and $\min(S_r)$=2.

A number of k0 values included in set $P_1$ corresponding to the second TDRA element is 8, which is greater than N, that is, greater than 2, such that 2 maximum k0 values are selected from $P_2$, and new set $S_2=\{7, 8\}$ is determined. A minimum value in $S_2$ is 7, and $\min(S_r)$=7.

A condition that $\{K1'\}=\{K1\}$, that is, $\{K1'\}=\{1, 2, 3\}$ is set.

Under the conditions that i=0 and r=0, in a case of m=0, a value of k1; $k1_i+k0_{r,m}-\min(S_r)$ is 1+2−2, that is, 1, a union set of $\{K1'\}$ and the value is $\{1, 2, 3\}$, and $\{K1'\}$ is updated to $\{1, 2, 3\}$.

In a case of m=1, a value of $k1_i+k0_{r,m}-\min(S_r)$ is 1+3−2, that is, 2, a union set of $\{K1'\}$ and the value is $\{1, 2, 3\}$, and $\{K1'\}$ is updated to $\{1, 2, 3\}$.

Under the conditions that i=0 and r=1, in a case of m=0, a value of $k1_i+k0_{r,m}-\min(S_r)$ is 1+7−7, that is, 1, a union set of $\{K1'\}$ and the value is $\{1, 2, 3\}$, and $\{K1'\}$ is updated to $\{1, 2, 3\}$.

In a case of m=1, a value of $k1_i+k0_{r,m}-\min(S_r)$ is 1+8−7, that is, 2, a union set of $\{K1'\}$ and the value is $\{1, 2, 3\}$, and $\{K1'\}$ is updated to $\{1, 2, 3\}$.

Under the conditions that i=1 and r=0, in a case of m=0, a value of $k1_i+k0_{r,m}-\min(S_r)$ is 2+2−2, that is, 2, a union set of $\{K1'\}$ and the value is $\{1, 2, 3\}$, and $\{K1'\}$ is updated to $\{1, 2, 3\}$.

In a case of m=1, a value of $k1_i+k0_{r,m}-\min(S_r)$ is 2+3−2, that is, 3, a union set of $\{K1'\}$ and the value is $\{1, 2, 3\}$, and $\{K1'\}$ is updated to $\{1, 2, 3\}$.

Under the conditions that i=1 and r=1, in a case of m=0, a value of $k1_i+k0_{r,m}-\min(S_r)$ is 2+7−7, that is, 2, a union set of $\{K1'\}$ and the value is $\{1, 2, 3\}$, and $\{K1'\}$ is updated to $\{1, 2, 3\}$.

In a case of m=1, a value of $k1_i+k0_{r,m}-\min(S_r)$ is 2+8−7, that is, 3, a union set of $\{K1'\}$ and the value is $\{1, 2, 3\}$, and $\{K1'\}$ is updated to $\{1, 2, 3\}$.

Under the conditions that i=2 and r=0,

In a case of m=0, a value of $k1_i+k0_{r,m}-\min(S_r)$ is 3+2−2, that is, 3, a union set of $\{K1'\}$ and the value is $\{1, 2, 3\}$, and $\{K1'\}$ is updated to $\{1, 2, 3\}$.

In a case of m=1, a value of $k1_i+k0_{r,m}-\min(S_r)$ is 3+3−2, that is, 4, a union set of $\{K1'\}$ and the value is $\{1, 2, 3, 4\}$, and $\{K1'\}$ is updated to $\{1, 2, 3, 4\}$.

Under the conditions that i=2 and r=1, in a case of m=0, a value of $k1_i+k0_{r,m}-\min(S_r)$ is 3+7-7, that is, 3, a union set of $\{K1'\}$ and the value is $\{1, 2, 3, 4\}$, and $\{K1'\}$ is updated to $\{1, 2, 3, 4\}$.

In a case of m=1, a value of $k1_i+k0_{r,m}-\min(S_r)$ is 3+8-7, that is, 4, a union set of $\{K1'\}$ and the value is $\{1, 2, 3, 4\}$, and $\{K1'\}$ is updated to $\{1, 2, 3, 4\}$.

Thus, it is determined that $\{K1'\}$ is $\{1, 2, 3, 4\}$.

Instance 2:

Number N of HARQ-ACK bundle is 4.

K1 set=$\{1, 2, 3\}$.

There are a total of 2 TDRA elements including a plurality of k0 values in the TDRA table. A first TDRA element includes 3 k0 values, and corresponds to set $P_1=\{0, 1, 2\}$. A second TDRA element includes 8 k0 values, and correspond to set $P_2=\{1, 2, 3, 4, 5, 6, 7, 8\}$.

It is determined that L=3, R=2, $M_1$=4, $M_2$=8, and N=4 according to the above preconditions.

A subset is selected first for a TDRA element including a plurality of k0 values.

A number of K0 values included in set $P_1$ corresponding to the first TDRA element is 3, which is less than N, that is, less than 4, such that $P_1$ is determined as new set $S_1=\{0, 1, 2\}$. A minimum value in $S_1$ is 0, and $\min(S_r)$=0.

A number of k0 values included in set $P_1$ corresponding to the second TDRA element is 8, which is greater than N, that is, greater than 4, such that 4 maximum k0 values are selected from $P_2$, and new set $S_2=\{5, 6, 7, 8\}$ is determined. A minimum value in $S_2$ is 5, and $\min(S_r)$=5.

A condition that $\{K1'\}=\{K1\}$, that is, $\{K1'\}=\{1, 2, 3\}$ is set.

Under the conditions that i=0 and r=0, in a case of m=0, a value of $k1_i+k0_{r,m}-\min(S_r)$ is 1+0−0, that is, 1, a union set of $\{K1'\}$ and the value is $\{1, 2, 3\}$, and $\{K1'\}$ is updated to $\{1, 2, 3\}$.

In a case of m=1, a value of $k1_i+k0_{r,m}-\min(S_r)$ is 1+1−0, that is, 2, a union set of $\{K1'\}$ and the value is $\{1, 2, 3\}$, and $\{K1'\}$ is updated to $\{1, 2, 3\}$.

In a case of m=2, a value of $k1_i+k0_{r,m}-\min(S_r)$ is 1+2−0, that is, 3, a union set of $\{K1'\}$ and the value is $\{1, 2, 3\}$, and $\{K1'\}$ is updated to $\{1, 2, 3\}$.

Under the conditions that i=0 and r=1, in a case of m=0, a value of $k1_i+k0_{r,m}-\min(S_r)$ is 1+5−5, that is, 1, a union set of $\{K1'\}$ and the value is $\{1, 2, 3\}$, and $\{K1'\}$ is updated to $\{1, 2, 3\}$.

In a case of m=1, a value of $k1_i+k0_{r,m}-\min(S_r)$ is 1+6−5, that is, 2, a union set of {K1'} and the value is {1, 2, 3}, and {K1'} is updated to {1, 2, 3}.

In a case of m=2, a value of $k1_i+k0_{r,m}-\min(S_r)$ is 1+7−5, that is, 3, a union set of {K1'} and the value is {1, 2, 3}, and {K1'} is updated to {1, 2, 3}.

In a case of m=3, a value of $k1_i+k0_{r,m}-\min(S_r)$ is 1+8−5, that is, 4, a union set of {K1'} and the value is {1, 2, 3, 4}, and {K1'} is updated to {1, 2, 3, 4}.

Under the conditions that i=1 and r=0,

In a case of m=0, a value of $k1_i+k0_{r,m}-\min(S_r)$ is 2+0−0, that is, 2, a union set of {K1'} and the value is {1, 2, 3, 4}, and {K1'} is updated to {1, 2, 3, 4}.

In a case of m=1, a value of $k1_i+k0_{r,m}-\min(S_r)$ is 2+1−0, that is, 3, a union set of {K1'} and the value is {1, 2, 3, 4}, and {K1'} is updated to {1, 2, 3, 4}.

In a case of m=2, a value of $k1_i+k0_{r,m}-\min(S_r)$ is 2+2−0, that is, 4, a union set of {K1'} and the value is {1, 2, 3, 4}, and {K1'} is updated to {1, 2, 3, 4}.

Under the conditions that i=1 and r=1, in a case of m=0, a value of $k1_i+k0_{r,m}-\min(S_r)$ is 2+5−5, that is, 2, a union set of {K1'} and the value is {1, 2, 3, 4}, and {K1'} is updated to {1, 2, 3, 4}.

In a case of m=1, a value of $k1_i+k0_{r,m}-\min(S_r)$ is 2+6−5, that is, 3, a union set of {K1'} and the value is {1, 2, 3, 4}, and {K1'} is updated to {1, 2, 3, 4}.

In a case of m=2, a value of $k1_i+k0_{r,m}-\min(S_r)$ is 2+7−5, that is, 4, a union set of {K1'} and the value is {1, 2, 3, 4}, and {K1'} is updated to {1, 2, 3, 4}.

In a case of m=3, a value of $k1_i+k0_{r,m}-\min(S_r)$ is 2+8−5, that is, 5, a union set of {K1'} and the value is {1, 2, 3, 4, 5}, and {K1'} is updated to {1, 2, 3, 4, 5}.

Under the conditions that i=2 and r=0, in a case of m=0, a value of $k1_i+k0_{r,m}-\min(S_r)$ is 3+0−0, that is, 3, a union set of {K1'} and the value is {1, 2, 3, 4, 5}, and {K1'} is updated to {1, 2, 3, 4, 5}.

In a case of m=1, a value of $k1_i+k0_{r,m}-\min(S_r)$ is 3+1−0, that is, 4, a union set of {K1'} and the value is {1, 2, 3, 4, 5}, and {K1'} is updated to {1, 2, 3, 4, 5}.

In a case of m=2, a value of $k1_i+k0_{r,m}-\min(S_r)$ is 3+2−0, that is, 5, a union set of {K1'} and the value is {1, 2, 3, 4, 5}, and {K1'} is updated to {1, 2, 3, 4, 5}.

Under the conditions that i=2 and r=1, in a case of m=0, a value of $k1_i+k0_{r,m}-\min(S_r)$ is 3+5−5, that is, 3, a union set of {K1'} and the value is {1, 2, 3, 4, 5}, and {K1'} is updated to {1, 2, 3, 4, 5}.

In a case of m=1, a value of $k1_i+k0_{r,m}-\min(S_r)$ is 3+6−5, that is, 4, a union set of {K1'} and the value is {1, 2, 3, 4, 5}, and {K1'} is updated to {1, 2, 3, 4, 5}.

In a case of m=2, a value of $k1_i+k0_{r,m}-\min(S_r)$ is 3+7−5, that is, 5, a union set of {K1'} and the value is {1, 2, 3, 4, 5}, and {K1'} is updated to {1, 2, 3, 4, 5}.

In a case of m=3, a value of $k1_i+k0_{r,m}-\min(S_r)$ is 3+8−5, that is, 6, a union set of {K1'} and the value is {1, 2, 3, 4, 5, 6}, and {K1'} is updated to {1, 2, 3, 4, 5, 6}.

Thus, it is determined that {K1'} is {1, 2, 3, 4, 5, 6}.

An example of the disclosure provides a method for determining an HARQ-ACK codebook. The method is performed by user equipment 101. The method includes:

S30: Receive a time domain resource allocation (TDRA) table from a network device.

S31c: Determine a second K1 set in a second scheduling method based on a first K1 set in a first scheduling method, a K0 set in the second scheduling method, and an HARQ feedback bundling value N, which includes:

determine a fourth K1 set based on a fourth K1 set initially set as an empty set and two formulas as follows:

$$\{K1'\} = \{K1'\} \cup \{k1_i + k0_{r,m} - \min\{S_r\}\}_{i=0,r=0,m=0}^{i=L-1,r=R-1,m=T_r-1}, \text{ and} \qquad (2)$$

$$\{K1''\} = \{K1\} \cup \{K1'\}. \qquad (3)$$

In the formulas, {K1''} is the second K1 set, {K1'} is the fourth K1 set, {K1} is the first K1 set, $k1_i$ is an ith k1 value included in first K1 set {K1}, $k0_{r,m}$ is an mth k0 value in $\{S_r\}$, $\{S_r\}$ is a subset of $\{P_r\}$, $\{P_r\}$ is a set of k0 values included in the rth element of the elements including the plurality of k0 values in the TDRA table, $T_r$ is a number of k0 values included in $\{S_r\}$, a value of $T_r$ is a minimum value of $M_r$ and N, $M_r$ is a number of k0 values included in $\{P_r\}$, $\min\{S_r\}$ is a minimum k0 value in $\{S_r\}$, and $\cup$ represents computation of a union set.

S32: Determine the HARQ-ACK codebook based on the second K1 set.

An example of the disclosure provides a method for determining an HARQ-ACK codebook. The method is performed by user equipment 101. The method includes:

S30: Receive a time domain resource allocation (TDRA) table from a network device.

S31d-1: Determine a fourth K1 set in a second scheduling method based on a first K1 set in a first scheduling method, a K0 set in the second scheduling method, and an HARQ feedback bundling value N; and determine the fourth K1 set as an empty set, a value of i as 0, a value of r as 0 and a value of m as 0, and execute an incremental loop based on i, r and m cyclically until loop end conditions are satisfied.

Contents executed in the incremental loop based on i, r and m include: determine a union set of the fourth K1 set and a combination value, and determine the union set as the fourth K1 set.

The combination value is $k1_i+k0_{r,m}-\min\{S_r\}$; $\{S_r\}$ is a subset of $\{P_r\}$, $\{P_r\}$ is a set, of k0 values included in the rth element of the elements including the plurality of k0 values in the TDRA table, $T_r$ is a number of k0 values included in $\{S_r\}$, a value of $T_r$ is less than or equal to N, and $\min\{S_r\}$ is a minimum k0 value in $\{S_r\}$.

The loop end conditions are that the value of i is L−1, the value of r is R−1, and the value of m is $T_r$−1; the loop end conditions are that the value of i reaches L−1, the value of r reaches R−1, and the value of m reaches $T_r$; and L is a number of k1 values included in the first K1 set, and R is a number of elements including a plurality of k0 values in the TDRA table.

S31d-2: Determine a union set of the fourth K1 set and the first K1 set as the second K1 set.

S32: Determine the HARQ-ACK codebook based on the second K1 set.

In a possible embodiment, S31b corresponds to an execution code as follows:

```
initialize {K1'} = { }
for i = 0: L − 1
for r = 0: R − 1
   for m = 0: min{Mr − 1, N − 1}

{K1'} = {K1'} ∪ {k1i + k0r,m − min{Sr}}i=0,r=0,m=0^{i=L−1,r=R−1,m=Tr−1} end
end
{K1"} ={K1}∪{K1'}
```

In an example of the disclosure, the fourth K1 set is set as an empty set in S31$d$-1, which can reduce a number of times of executing a union operation, and improve processing efficiency compared with a case of setting the fourth K1 set as {K1}.

An example of the disclosure provides a method for determining an HARQ-ACK codebook. The method is performed by user equipment 101. The method includes:

S30: Receive a time domain resource allocation (TDRA) table from a network device; and S31$a$, S31$b$, S31$c$ or S31$d$1-2.

In the above steps: if the number of the k0 values included in {$P_r$} is greater than N, N k0 values are selected from {$P_r$} a as {$S_r$}.

If the number of k0 values included in {$P_r$} is less than or equal to N, {$P_r$} is taken as {$S_r$}.

The case that N k0 values are selected from {$P_r$} includes one of cases as follows:

A first case is that N k0 values having maximum values are selected from {$P_r$}.

A second case is that k0 values corresponding to N PDSCHs at last time positions among a plurality of PDSCHs scheduled by the same DCI are selected.

A third case is that a k0 value corresponding to one PDSCH at a last time position among a plurality of PDSCHs scheduled by the same DCI, and other N−1 k0 values are selected from the PDSCHs.

S32: Determine the HARQ-ACK codebook based on the second K1 set.

An example of the disclosure provides a method for determining an HARQ-ACK codebook. The method is performed by user equipment 101. With reference to FIG. 5, a flow diagram of a method for determining an HARQ-ACK codebook according to an example is shown in FIG. 5. As shown in FIG. 5, the method includes steps 31 through 33.

S31: Determine a second K1 set in a second scheduling method based on a first K1 set in a first scheduling method, a K0 set in the second scheduling method, and an HARQ feedback bundling value N.

S32: Determine the HARQ-ACK codebook based on the second K1 set.

S33: Determine a feedback window for the HARQ-ACK codebook based on the second K1 set; and feed back the HARQ-ACK codebook based on the feedback window.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

In an example of the disclosure, it can be ensured that no matter which k1 value scheduling DCI indicates from a configured K1 set, a plurality of PDSCHs scheduled by the DCI can feed back a minimum extension K1 set (that is, an extension K1 set including fewest k1 values) of a Type 1 HARQ-ACK codebook on one HARQ-ACK PUCCH resource.

An example of the disclosure provides a method for determining an HARQ-ACK codebook. The method is performed by user equipment 101. With reference to FIG. 6, a flow diagram of a method for determining an HARQ-ACK codebook according to an example is shown in FIG. 6. As shown in FIG. 6, the method includes steps 30 through 33.

S30: Receive configuration information from a network device. The configuration information may include first configuration information, second configuration information and third configuration information.

The first configuration information includes information configured to indicate the first K1 set in the first scheduling method.

The second configuration information includes information configured to indicate the K0 set in the second scheduling method. For instance, the second configuration information includes a time domain resource allocation (TDRA) table, and the TDRA table includes the K0 set in the second scheduling method.

The third configuration information includes information configured to indicate the HARQ feedback bundling value N.

S31: Determine a second K1 set in a second scheduling method based on a first K1 set in a first scheduling method, a K0 set in the second scheduling method, and an HARQ feedback bundling value N.

S32: Determine the HARQ-ACK codebook based on the second K1 set.

S33: Determine a feedback window for the HARQ-ACK codebook based on the second K1 set; and feed back the HARQ-ACK codebook based on the feedback window.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

It should be understood that only one or two pieces of the first configuration information, the second configuration information and the third configuration information may be received in S30. The first K1 set in the first scheduling method corresponding to the first configuration information may be determined by the user equipment according to a protocol agreement; the K0 set in the second scheduling method corresponding to the second configuration information may also be determined by the user equipment according to the protocol agreement; and an HARQ feedback bundling value N corresponding to the third configuration information may also be determined by the user equipment according to the protocol agreement.

In a typical instance, the first K1 set in the first scheduling method corresponding to the first configuration information and an HARQ feedback bundling value N corresponding to the third configuration information are determined by the user equipment according to the protocol agreements. The K0 set in the second scheduling method corresponding to the second configuration information is received by the user equipment from the network device.

An example of the disclosure provides a method for determining an HARQ-ACK codebook. The method is performed by a network device 102. The method includes:

transmit second configuration information to user equipment, where the second configuration information includes information configured to indicate a K0 set in a second scheduling method; determine a second K1 set in the second scheduling method based on a first K1 set in a first scheduling method, the K0 set in the second scheduling method, and an HARQ feedback bundling value N; and determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

In a possible embodiment, the second configuration information includes a time domain resource allocation (TDRA) table, and the TDRA table includes the K0 set in the second scheduling method.

In a possible embodiment, the second configuration information is a time domain resource allocation (TDRA) table.

An example of the disclosure provides a method for determining an HARQ-ACK codebook. The method is performed by a network device 102. The method includes:

transmit first configuration information and/or third configuration information to the user equipment. The first configuration information includes information configured to indicate the first K1 set in the first scheduling method. The third configuration information includes information configured to indicate the HARQ feedback bundling value N.

The method further includes: transmit second configuration information to user equipment, where the second configuration information includes information configured to indicate a K0 set in a second scheduling method; determine a second K1 set in the second scheduling method based on a first K1 set in a first scheduling method, the K0 set in the second scheduling method, and an HARQ feedback bundling value N; and determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

In a possible embodiment, the second configuration information includes a time domain resource allocation (TDRA) table, and the TDRA table includes the K0 set in the second scheduling method.

In a possible embodiment, the second configuration information is a time domain resource allocation (TDRA) table.

An example of the disclosure provides a method for decoding an HARQ-ACK codebook. The method is performed by a network device 102. The method includes:

receive the HARQ-ACK codebook from user equipment;
determine a second K1 set in a second scheduling method based on a first K1 set in a first scheduling method, a K0 set in the second scheduling method, and an HARQ feedback bundling value N; and
decode the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located. In the first scheduling method, one piece of DCI schedules one PDSCH. In the second scheduling method, one piece of DCI schedules a plurality of PDSCHs.

In some possible embodiments, the method further includes: transmit first configuration information to user equipment. The first configuration information includes information configured to indicate the first K1 set in the first scheduling method.

In some possible embodiments, the method further includes: transmit third configuration information to the user equipment. The third configuration information includes information configured to indicate the HARQ feedback bundling value N.

In some possible embodiments, the method further includes: transmit second configuration information to the user equipment. The second configuration information includes information configured to indicate the K0 set in the second scheduling method. In an instance, the second configuration information is a time domain resource allocation (TDRA) table, and the TDRA table includes the K0 set in the second scheduling method.

Based on the same concept as the above method examples, an example of the disclosure further provides a communication apparatus. The communication apparatus may have the function of the user equipment in the above method example and may be configured to execute the steps performed by the user equipment provided in the above method example. The function may be implemented by hardware, software or hardware executing corresponding software. The hardware or software includes one or more modules corresponding to the above function.

In a possible implementation, the communication apparatus 700 shown in FIG. 7 may serve as the user equipment involved in the above method example and execute the steps performed by the user equipment in the above method example. As shown in FIG. 7, the communication apparatus 700 may include a transceiver module 701 and a processing module 702. The transceiver module 701 and the processing module 702 are coupled to each other. The transceiver module 701 may be configured to support the communication apparatus 700 in communication. The transceiver module 701 may have a wireless communication function, for instance, may carry out wireless communication with other communication apparatuses through a wireless air interface. The processing module 702 may be configured to support the communication apparatus 700 in executing processing actions in the above method examples, which include but are not limited to generation of information and messages transmitted by the transceiver module 701, and/or demodulation and decoding of signals received by the transceiver module 701.

In an instance, when the steps implemented by the user equipment are executed,
the processing module 702 is configured to determine a second K1 set in a second scheduling method based on a first K1 set in a first scheduling method, a K0 set in the second scheduling method, and an HARQ feedback bundling value N; and
determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

In a possible embodiment, the transceiver module 701 is configured to receive first configuration information from a network device, where the first configuration information includes information configured to indicate the first K1 set in the first scheduling method; or determine the first K1 set in the first scheduling method based on a communication protocol.

In a possible embodiment, the transceiver module 701 is configured to receive second configuration information from a network device. The second configuration information includes information configured to indicate the K0 set in the second scheduling method. In an instance, the second configuration information includes a time domain resource allocation (TDRA) table, and the TDRA table includes the K0 set in the second scheduling method.

In a possible embodiment, the transceiver module 701 is configured to receive third configuration information from the network device. The third configuration information includes information configured to indicate the HARQ feedback bundling value N.

Figure 8:
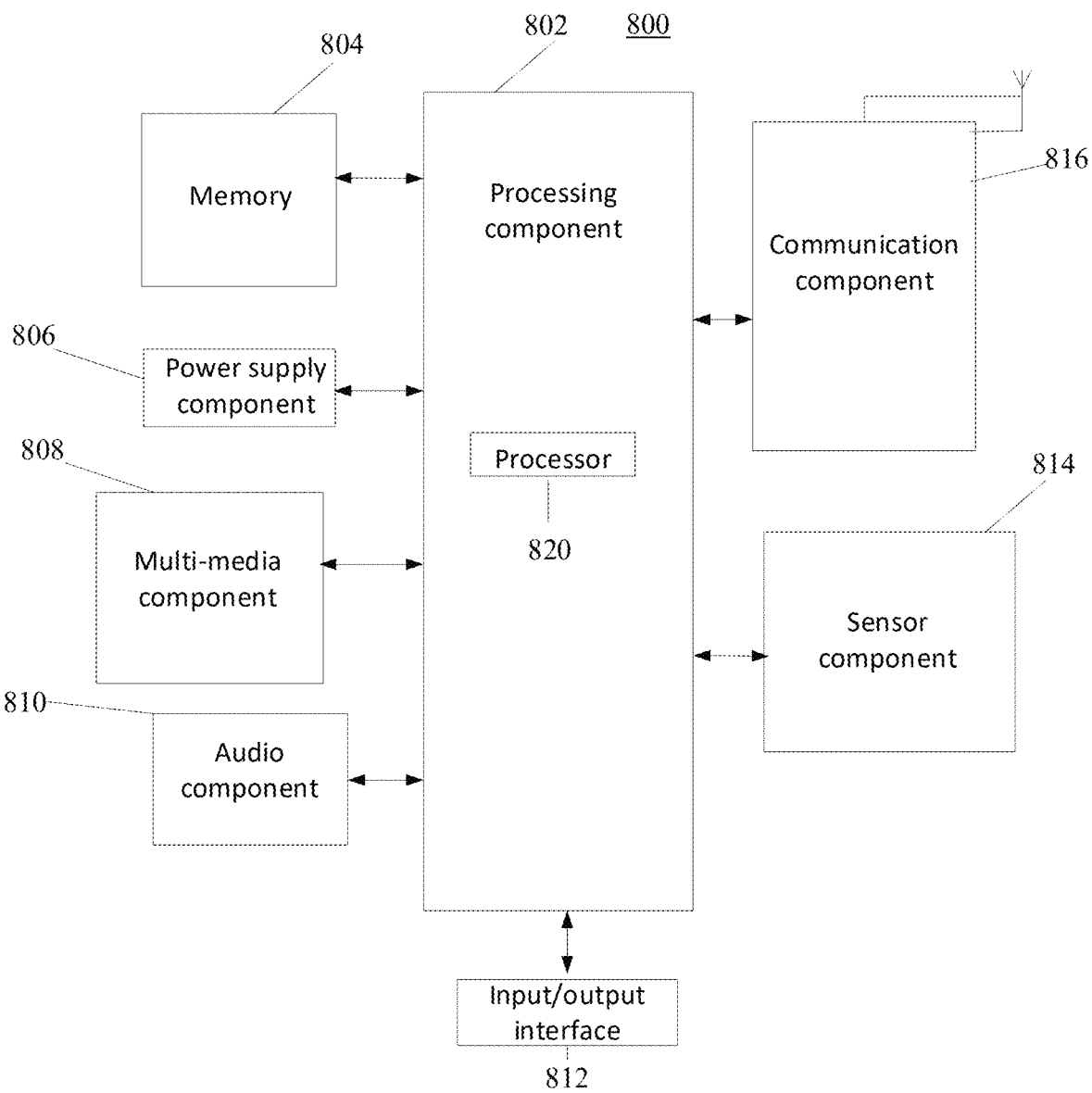
FIG. 8 is a structural diagram of another apparatus for feeding back an HARQ-ACK codebook according to an example.

In a case that the communication apparatus is user equipment, the structure of the communication apparatus may be as shown in FIG. 8. The apparatus 800 may be a mobile phone, a computer, a digital broadcasting terminal, a message transceiver device, a game console, a tablet device, a medical device, a fitness device, a personal digital assistant, etc.

With reference to FIG. 8, the apparatus 800 may include one or more of the following components: a processing component 802, a memory 804, an electric component 806, a multi-media component 808, an audio component 810, an input/output (I/O) interface 812, a sensor component 814, and a communication component 816.

The processing component 802 typically controls overall operations of the apparatus 800, such as operations associated with display, telephone call, data communication, camera operation and record operation. The processing component 802 may include one or more processors 820 to execute an instruction, so as to complete all steps or some steps of the above method. In addition, the processing component 802 may include one or more modules such that interaction between the processing component 802 and other components can be facilitated. For instance, the processing component 802 may include a multi-media module such that interaction between the multi-media component 808 and the processing component 802 can be facilitated.

The memory 804 is configured to store various types of data, so as to support operations at the device 800. Instances of such data include instructions configured for any application or method operating on the apparatus 800, such as contact data, phonebook data, messages, pictures and videos. The memory 804 may be implemented by any type of volatile or non-volatile storage devices or their combinations, such as a static random-access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or an optical disk.

The electric component 806 provides power for various components of the apparatus 800. The electric component 806 may include a power source management system, one or more power sources, and other components associated with generation, management and power distribution of the apparatus 800.

The multi-media component 808 includes a screen that provides an output interface between the apparatus 800 and a user. In some examples, the screen may include a liquid crystal display (LCD) and a touch panel (TP). If the screen includes a touch panel, the screen may be implemented as a touch screen such that an input signal from the user can be received. The touch panel includes one or more touch sensors such that a touch, a swipe and a gesture on the touch panel can be sensed. The touch sensor can not only sense a boundary of a touch or swipe, but also measure time and pressure associated with the touch or swipe. In some examples, the multi-media component 808 includes a front-facing camera and/or a rear-facing camera. When the device 800 is in an operating mode, such as a shooting mode or a video mode, the front facing camera and/or the rear facing camera can receive external multi-media data. Each of the front-facing camera and the rear-facing camera may be a fixed optical lens system or have focusing and optical zooming capabilities.

The audio component 810 is configured to output and/or input an audio signal. For instance, the audio component 810 may include a microphone (MIC) that is configured to receive an external audio signal when the apparatus 800 is in an operating method, such as a call mode, a recording mode or a voice recognition mode. The received audio signal may be further stored in the memory 804 or transmitted by means of the communication component 816. In some examples, the audio component 810 further includes a loudspeaker configured to output the audio signal.

The I/O interface 812 provides an interface between the processing component 802 and peripheral interface modules, such as keyboards, click wheels and buttons. These buttons may include but are not limited to a home button, a volume button, a start button and a lock button.

The sensor component 814 may include one or more sensors configured to provide state assessment of various aspects of the apparatus 800. For instance, the sensor component 814 may detect a turned-on/turned-off state of the device 800, and relative positioning of components. For instance, a display and keypad of the apparatus 800. The sensor component 814 may further detect a change in position of the apparatus 800 or a component of the apparatus 800, presence or absence of contact between a user and the apparatus 800, orientation or acceleration/deceleration of the apparatus 800, and a temperature change of the apparatus 800. The sensor component 814 may include a proximity sensor, which is configured to detect the presence of a nearby object in the absence of any physical contact. The sensor component 814 may further include a light sensor, such as a complementary metal oxide semiconductor (CMOS) or charge coupled device (CCD) image sensor, which are configured to be used in imaging applications. In some examples, the sensor component 814 may further include an acceleration sensor, a gyroscopic sensor, a magnetic sensor, a pressure sensor or a temperature sensor.

The communication component 816 is configured to facilitate wired or wireless communication between the apparatus 800 and other devices. The apparatus 800 may access a wireless network based on a communication standard, such as Wi-Fi, 4G, 5G or their combinations. In an example, the communication component 816 receives a broadcast signal or broadcast related information from an external broadcast management system by means of a broadcast channel. In an example, the communication component 816 further includes a near-field communication (NFC) module such that short-range communication can be facilitated. For instance, the NFC module may be implemented based on a radio frequency identification (RFID) technology, an infrared data association (IrDA) technology, an ultra wideband (UWB) technology, a Bluetooth (BT) technology and other technologies.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic elements, which is configured to execute the above method.

In an example, a non-transitory computer-readable storage medium including an instruction is further provided, such as a memory 804 including an instruction. The above instruction may be performed by the processor 820 of the apparatus 800, so as to complete the above method. For instance, the non-transitory computer-readable storage medium may be an ROM, a random access memory (RAM), a compact disc read-only memory (CD-ROM), a magnetic tape, a floppy disk or an optical data storage device, etc.

Based on the same concept as the above method example, an example of the disclosure further provides a communication apparatus. The communication apparatus may have the function of the network device in the above method example and may be configured to execute the steps performed by the network device provided in the above method example. The function may be implemented by hardware, software or hardware executing corresponding software. The hardware or software includes one or more modules corresponding to the above function.

Figure 9:
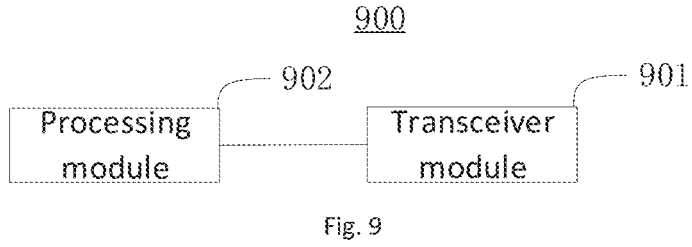
FIG. 9 is a structural diagram of yet another apparatus for feeding back an HARQ-ACK codebook according to an example.

In a possible implementation, the communication apparatus 900 shown in FIG. 9 may serve as the network device involved in the above method example and execute the steps performed by the network device in the above method example. As shown in FIG. 9, the communication apparatus 900 may include a transceiver module 901 and a processing module 902. The transceiver module 901 and the processing module 902 are coupled to each other. The transceiver module 901 may be configured to support the communication apparatus 900 in communication. The transceiver module 901 may have a wireless communication function, for instance, may carry out wireless communication with other communication apparatuses through a wireless air interface. The processing module 902 may be configured to support the communication apparatus 900 in executing processing actions in the above method examples, which include but are not limited to generation of information and messages transmitted by the transceiver module 901, and/or demodulation and decoding of signals received by the transceiver module 901.

In an instance, when the step implemented by the network device are executed, the transceiver module 901 is configured to transmit second configuration information to user equipment, where the second configuration information includes information configured to indicate a K0 set in a second scheduling method; determine a second K1 set in the second scheduling method based on a first K1 set in a first scheduling method, the K0 set in the second scheduling method, and an HARQ feedback bundling value N; and determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

In a possible embodiment, the second configuration information includes a time domain resource allocation (TDRA) table, and the TDRA table includes the K0 set in the second scheduling method.

In a possible embodiment, the transceiver module 901 is further configured to transmit first configuration information to the user equipment. The first configuration information includes information configured to indicate the first K1 set in the first scheduling method.

In a possible embodiment, the transceiver module 901 is further configured to transmit third configuration information to the user equipment. The third configuration information includes information configured to indicate the HARQ feedback bundling value N.

In another instance, when the steps implemented by the network device are executed, the transceiver module 901 is configured to receive the HARQ-ACK codebook from the user equipment. The processing module 902 is configured to determine a second K1 set in a second scheduling method based on a first K1 set in a first scheduling method, a K0 set in the second scheduling method, and an HARQ feedback bundling value N; and decode the HARQ-ACK codebook based on the second K1 set.

Figure 10:
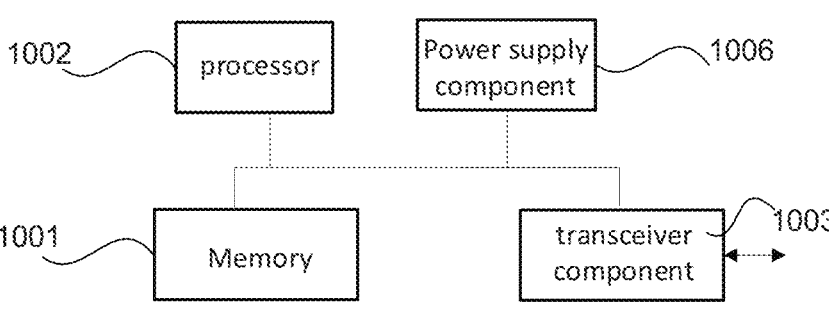
FIG. 10 is a structural diagram of still another apparatus for feeding back an HARQ-ACK codebook according to an example.

In a case that the communication apparatus is a network device, the structure of the communication apparatus may be as shown in FIG. 10. A structure of a communication apparatus will be described with a base station as an instance. As shown in FIG. 10, the apparatus 1000 includes a memory 1001, one or more processors 1002, a transceiver component 1003, and a power supply component 1006. The memory 1001 is coupled to the processor 1002 and may be configured to store a program and data necessary for the communication apparatus 1000 to implement various functions. The processor 1002 is configured to support the communication apparatus 1000 in executing a corresponding function in the above method. The function may be implemented by calling a program stored in the memory 1001. The transceiver component 1003 may be a wireless transceiver, and may be configured to support the communication apparatus 1000 in receiving signaling and/or data and transmitting signaling and/or data through a wireless air interface. The transceiver component 1003 may also be referred to as a transceiver unit or a communication unit. The transceiver component 1003 may include a radio frequency component and one or more antennas. The radio frequency component may be a remote radio unit (RRU), and may be configured for transmission of radio frequency signals and conversion between radio frequency signals and baseband signals. The one or more antennas may be specifically configured to radiate and receive radio frequency signals.

When the communication apparatus 1000 is required to transmit data, the processor 1002 may carry out baseband processing on the data to be transmitted and output a baseband signal to the radio frequency unit. The radio frequency unit may carry out radio frequency processing on the baseband signal and transmit the radio frequency signal in the form of an electromagnetic wave by means of an antenna. When data is transmitted to the communication apparatus 1000, the radio frequency unit receives a radio frequency signal by means of the antenna, converts the radio frequency signal into a baseband signal, and outputs the baseband signal to the processor 1002. The processor 1002 converts the baseband signal into data and processes the data.

In an example, a non-transitory computer-readable storage medium including an instruction is further provided, such as a memory 1001 including an instruction. The above instruction may be performed by the processor 1002 of the apparatus 1000, so as to complete the above method. For instance, the non-transitory computer-readable storage medium may be an ROM, a random access memory (RAM), a compact disc read-only memory (CD-ROM), a magnetic tape, a floppy disk or an optical data storage device, etc.

In a first aspect, a method for determining an HARQ-ACK codebook is provided. The method is performed by user equipment and includes:

determining a second K1 set in a second scheduling method based on a first K1 set in a first scheduling method, a K0 set in the second scheduling method, and an HARQ feedback bundling value N; and determining the HARQ-ACK codebook based on the second K1 set.

A k1 value in the first K1 set is configured to indicate a number of time units offset from a time unit in which a physical downlink shared channel (PDSCH) is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

In an example of the disclosure, it can be ensured that no matter which k1 value scheduling DCI indicates from a configured K1 set, a plurality of PDSCHs scheduled by the DCI can feed back a minimum extension K1 set (that is, an extension K1 set including fewest k1 values) of a Type 1 HARQ-ACK codebook on one HARQ-ACK PUCCH resource.

In a possible embodiment, the K0 set includes at least one K0 subset. Each K0 subset includes one or more k0 values. Each k0 value corresponds to a time interval in the second scheduling method between a time unit in which a plurality of PDSCHs scheduled by one piece of DCI are located and a time unit in which the DCI is located.

In a possible embodiment, the method further includes: receiving a time domain resource allocation (TDRA) table from a network device.

The K0 set includes at least one K0 subset. The K0 subset is a set of k0 values included by an rth element of elements including a plurality of k0 values in the TDRA table.

In a possible embodiment, the determining the second K1 set in the second scheduling method based on the first K1 set in the first scheduling method, the K0 set in the second scheduling method, and an HARQ feedback bundling value N includes: determining the second K1 set based on a formula as follows:

$$\{K1'\} = \{K1\} \cup \{k1_i + k0_{r,m} - \min\{S_r\}\}_{i=0,r=0,m=0}^{i=L-1,r=R-1,m=T_r-1}$$

In the formula, $\{K1'\}$ is the second K1 set, $\{K1\}$ is the first K1 set, $k1_i$ is an ith k1 value included in the first K1 set $\{K1\}$, $k0_{r,m}$ is an mth k0 value in $\{S_r\}$, $\{S_r\}$ is a subset of $\{P_r\}$, $\{P_r\}$ is a set of k0 values included in the rth element of the elements including the plurality of k0 values in the TDRA table, $T_r$ is a number of k0 values included in $\{S_r\}$, a value of $T_r$ is a minimum value of $M_r$ and N, $M_r$ is a number of k0 values included in $\{P_r\}$, $\min\{S_r\}$ is a minimum k0 value in $\{S_r\}$, and $\cup$ represents computation of a union set.

In a possible embodiment, the determining the second K1 set in the second scheduling method based on the first K1 set in the first scheduling method, the K0 set in the second scheduling method, and an HARQ feedback bundling value N includes:

determining a third K1 set as the first K1 set, a value of i as 0, a value of r as 0 and a value of m as 0, executing an incremental loop based on i, r and m cyclically, and taking the third K1 set as the second K1 set after loop end conditions are satisfied.

Contents executed in the incremental loop based on i, r and m include: determining a union set of the third K1 set and a combination value, and determining the union set as the third K1 set.

The combination value is $k1_i + k0_{r,m} - \min\{S_r\}$; $\{S_r\}$ is a subset of $\{P_r\}$, $\{P_r\}$ is a set of k0 values included in the rth element of the elements including the plurality of k0 values in the TDRA table, $T_r$ is a number of k0 values included in $\{S_r\}$, the value of $T_r$ is a minimum value of $M_r$ and N, $M_r$ is a number of k0 values included in $\{P_r\}$; and $\min\{S_r\}$ is a minimum k0 value in $\{S_r\}$.

The loop end conditions are that the value of i is L−1, the value of r is R−1, and the value of m is $T_r$−1; the loop end conditions are that the value of i reaches L−1, the value of r reaches R−1, and the value of m reaches $T_r$; and L is a number of k1 values included in the first K1 set, and R is a number of elements including a plurality of k0 values in the TDRA table.

In a possible embodiment, the determining the second K1 set in the second scheduling method based on the first K1 set in the first scheduling method, the K0 set in the second scheduling method, and an HARQ feedback bundling value N includes:

determining a fourth K1 set based on a fourth K1 set initially set as an empty set and two formulas as follows:

$$\{K1'\} = \{K1'\} \cup \{k1_i + k0_{r,m} - \min\{S_r\}\}_{i=0,r=0,m=0}^{i=L-1,r=R-1,m=T_r-1}$$

$$\{K1''\} = \{K1\} \cup \{K1'\}$$

In the formulas, $\{K1''\}$ is the second K1 set, $\{K1'\}$ is the fourth K1 set, $\{K1\}$ is the first K1 set, $k1_i$ is an ith k1 value included in first K1 set $\{K1\}$, $k0_{r,m}$ is an mth k0 value in $\{S_r\}$, $\{S_r\}$ is a subset of $\{P_r\}$, $\{P_r\}$ is a set of k0 values included in the rth element of the elements including the plurality of k0 values in the TDRA table, $T_r$ is a number of k0 values included in $\{S_r\}$, a value of $T_r$ is a minimum value of $M_r$ and N, $M_r$ is a number of k0 values included in $\{P_r\}$, $\min\{S_r\}$ is a minimum k0 value in $\{S_r\}$, and $\cup$ represents computation of a union set.

In a possible embodiment, the determining the second K1 set in the second scheduling method based on the first K1 set in the first scheduling method, the K0 set in the second scheduling method, and an HARQ feedback bundling value N includes:

determining a fourth K1 set in the second scheduling method based on the first K1 set in the first scheduling method, the K0 set in the second scheduling method, and the HARQ feedback bundling value N; and determining a union set of the fourth K1 set and the first K1 set as the second K1 set.

The determining the fourth K1 set in the second scheduling method based on the first K1 set in the first scheduling method, the K0 set in the second scheduling method, and the HARQ feedback bundling value N includes:

determining the fourth K1 set as an empty set, a value of i as 0, a value of r as 0 and a value of m as 0, and executing an incremental loop based on i, r and m cyclically until loop end conditions are satisfied.

Contents executed in the incremental loop based on i, r and m include: determining a union set of the fourth K1 set and a combination value, and determining the union set as the fourth K1 set.

The combination value is $k1_i + k0_{r,m} - \min\{S_r\}$; $\{S_r\}$ is a subset of $\{P_r\}$, $\{P_r\}$ is the set of k0 values included in the rth element of the elements including the plurality of k0 values in the TDRA table, $T_r$ is the number of k0 values included in $\{S_r\}$, a value of $T_r$ is less than or equal to N; and $\min\{S_r\}$ is the minimum k0 value in $\{S_r\}$.

The loop end conditions are that the value of i is L−1, the value of r is R−1, and the value of m is $R_r$−1; the loop end conditions are that the value of i reaches L−1, the value of r reaches R−1, and the value of m reaches $T_r$; and L is a number of k1 values included in the first K1 set, and R is a number of elements including a plurality of k0 values in the TDRA table.

In a possible embodiment, the method further includes:

selecting N k0 values from $\{P_r\}$ as $\{S_r\}$ if the number of the k0 values included in $\{P_r\}$ is greater than N; and taking $\{P_r\}$ as $\{S_r\}$ if the number of k0 values included in $\{P_r\}$ is less than or equal to N.

In a possible embodiment, the selecting N k0 values from $\{P_r\}$ includes one of the followings:

selecting N k0 values having maximum values from $\{P_r\}$;

selecting k0 values corresponding to N PDSCHs at last time positions among a plurality of PDSCHs scheduled by the same DCI; and selecting a k0 value corresponding to one PDSCH at a last time position among a plurality of PDSCHs scheduled by the same DCI, and any other N−1 k0 values from the PDSCHs.

In a possible embodiment, the method further includes:

determining a feedback window for the HARQ-ACK codebook based on the second K1 set; and feeding back the HARQ-ACK codebook based on the feedback window.

In a possible embodiment, the method further includes:

receiving first configuration information from a network device, where the first configuration information includes information configured to indicate the first K1 set in the first scheduling method; or determining the first K1 set in the first scheduling method based on a communication protocol.

In a possible embodiment, the method further includes: receiving second configuration information from a network device. The second configuration information includes information configured to indicate the K0 set in the second scheduling method.

In a possible embodiment, the second configuration information includes a time domain resource allocation (TDRA) table, and the TDRA table includes the K0 set in the second scheduling method.

In a possible embodiment, the method further includes: receiving third configuration information from a network device, where the third configuration information includes information configured to indicate the HARQ feedback bundling value N, or determining HARQ feedback bundling value N based on a communication protocol.

In a second aspect, a method for determining a hybrid automatic repeat request acknowledgement (HARQ-ACK) codebook is provided. The method is performed by a network device and includes:

transmitting second configuration information to user equipment, where the second configuration information includes information configured to indicate a K0 set in a second scheduling method; determining a second K1 set in the second scheduling method based on a first K1 set in a first scheduling method, the K0 set in the second scheduling method, and an HARQ feedback bundling value N; and determining the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located.

In the first scheduling method, one piece of DCI schedules one PDSCH. In the second scheduling method, one piece of DCI schedules a plurality of PDSCHs.

In a possible embodiment, the second configuration information includes a time domain resource allocation (TDRA) table, and the TDRA table includes the K0 set in the second scheduling method.

In a possible embodiment, the method further includes:

transmitting first configuration information to the user equipment. The first configuration information includes information configured to indicate the first K1 set in the first scheduling method.

In a possible embodiment, the method further includes: transmitting third configuration information to the user equipment. The third configuration information includes information configured to indicate the HARQ feedback bundling value N.

In a second aspect, a method for decoding a HARQ-ACK codebook is further provided. The method is performed by a network device and includes:

receiving the HARQ-ACK codebook from user equipment;

determining a second K1 set in a second scheduling method based on a first K1 set in a first scheduling method, a K0 set in the second scheduling method, and an HARQ feedback bundling value N; and decoding the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located. In the first scheduling method, one piece of DCI schedules one PDSCH. In the second scheduling method, one piece of DCI schedules a plurality of PDSCHs.

In a third aspect, a communication apparatus is provided. The communication apparatus may be configured to execute steps performed by the user equipment in the above first aspect or any one of possible designs of the first aspect. The user equipment can implement all functions in the above methods in a form of a hardware structure, a software module, or a hardware structure and software module.

In a case that the communication apparatus shown in the third aspect is implemented by a software module, the communication apparatus may include a transceiver module. The transceiver module may be configured to support the communication apparatus in communication.

When the steps in the above first aspect are executed, a processing module is configured to determine a second K1 set in a second scheduling method based on a first K1 set in a first scheduling method, a K0 set in the second scheduling method, and an HARQ feedback bundling value N; and determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A K0 value in the K0 set is configured to indicate a number of time units offset from a time unit in which the PDSCH is located to a time unit in which an uplink control channel corresponding to the PDSCH is located. In the first scheduling method, one piece of DCI schedules one PDSCH. In the second scheduling method, one piece of DCI schedules a plurality of PDSCHs.

In a fourth aspect, a communication apparatus is provided. The communication apparatus may be configured to execute steps performed by the network device in the above second aspect or any one of possible designs of the second aspect. The network device can implement all functions in the above methods in a form of a hardware structure, a software module, or a hardware structure and software module.

In a case that the communication apparatus in the fourth aspect is implemented by a software module, the communication apparatus may include a processing module and a transceiver module that are coupled to each other. The processing module may be configured for the communication apparatus to execute processing operations, for example, generate information/messages required to be transmitted, or process received signals such that information/messages can be obtained. The transceiver module may be configured to support the communication apparatus in communication. The transceiver module may be configured to support the communication apparatus in communication.

When the steps in the above second aspect are executed, the transceiver module is configured to transmit second configuration information to user equipment, where the second configuration information includes information configured to indicate a K0 set in a second scheduling method; determine a second K1 set in the second scheduling method based on a first K1 set in a first scheduling method, the K0 set in the second scheduling method, and an HARQ feedback bundling value N; and determine the HARQ-ACK codebook based on the second K1 set.

A k1 value in the first K1 set is configured to indicate a number of time units offset from a time unit in which a PDSCH is located to a time unit in which an uplink channel of an HARQ-ACK corresponding to the PDSCH is located. A k0 value in the K0 set is configured to indicate a number of time units offset from a time unit in which the PDSCH is located to a time unit in which an uplink control channel corresponding to the PDSCH is located. In the first scheduling method, one piece of DCI schedules one PDSCH. In the second scheduling method, one piece of DCI schedules a plurality of PDSCHs.

When the steps in the above second aspect are executed, the transceiver module is further configured to receive the HARQ-ACK codebook from the user equipment. The processing module is further configured to determine a second K1 set in a second scheduling method based on a first K1 set in a first scheduling method, a K0 set in the second scheduling method, and an HARQ feedback bundling value N; and decode the HARQ-ACK codebook based on the second K1 set.

In a fifth aspect, a communication apparatus is provided. The communication apparatus includes one or more processors and a memory. The memory is configured to store a computer program. The one or more processors are collectively configured to execute the computer program, so as to implement the first aspect or any possible design of the first aspect.

In a sixth aspect, a communication apparatus is provided. The communication apparatus includes one or more processors and a memory. The memory is configured to store a computer program. The one or more processors are collectively configured to execute the computer program, so as to implement the second aspect or any possible design of the second aspect.

In a seventh aspect, a non-transitory computer-readable storage medium is provided. The non-transitory computer-readable storage medium stores an instruction (or referred to as a computer program, or a program). The instruction causes a computer to execute the above first aspect or any possible design of the first aspect when called to be executed on the computer.

In an eighth aspect, a non-transitory computer-readable storage medium is provided. The non-transitory computer-readable storage medium stores an instruction (or referred to as a computer program or a program). The instruction causes a computer to execute the above second aspect or any possible design of the second aspect when called to be executed on the computer.

Those skilled in the art could easily conceive of other implementation solutions of examples of the disclosure upon consideration of the description and the invention disclosed in the implementation. The disclosure is intended to cover any variations, uses or adaptive changes of examples of the disclosure, which follow the general principles of examples of the disclosure and include common general knowledge or customary technical means in the art that is not disclosed in the disclosure. The description and examples are regarded as illustrative merely. The true scope and spirit of the disclosure are indicated by the following claims.

It should be understood that examples of the disclosure are not limited to a precise structure described above and shown in accompanying drawings, and can have various modifications and changes without departing from the scope of the disclosure. The scope of examples of the disclosure is limited by the appended claims merely.

INDUSTRIAL APPLICABILITY

In the disclosure, it can be ensured that no matter which k1 value scheduling DCI indicates from a configured K1 set, a plurality of PDSCHs scheduled by the DCI can feed back a minimum extension K1 set (that is, an extension K1 set including fewest k1 values) of a Type 1 HARQ-ACK codebook on one HARQ-ACK PUCCH resource.

The invention claimed is:

1. A method for determining a hybrid automatic repeat request acknowledgement (HARQ-ACK) codebook, performed by user equipment and comprising:

receiving second configuration information from a network device, wherein the second configuration information comprises information configured to indicate a K0 set in a second scheduling method;

determining a second K1 set in the second scheduling method based on a first K1 set in a first scheduling method, the K0 set in the second scheduling method, and an HARQ feedback bundling value N; and determining the HARQ-ACK codebook based on the second K1 set; wherein a k1 value in the first K1 set is configured to indicate a number of time units offset from a time unit in which a physical downlink shared channel (PDSCH) is located to a time unit in which an uplink channel of an HARQ ACK corresponding to the PDSCH is located; a k0 value in the K0 set is configured to indicate a number of time units offset from a time unit in which the PDSCH is located to a time unit in which an uplink control channel corresponding to the PDSCH is located; in the first scheduling method, one piece of downlink control information (DCI) schedules one PDSCH; and in the second scheduling method, one piece of DCI schedules a plurality of PDSCHs.

2. The method according to claim 1, wherein the K0 set comprises at least one K0 subset, the at least one K0 subset comprises one or more k0 values, and the k0 value corresponds to a time interval in the second scheduling method between a time unit in which a plurality of PDSCHs scheduled by one piece of DCI are located and a time unit in which the DCI is located.

3. The method according to claim 1, further comprising:

receiving a time domain resource allocation (TDRA) table from the network device; and the K0 set comprises at least one K0 subset, and the at least one K0 subset is a set of k0 values comprised by an rth element of elements comprising a plurality of k0 values in the TDRA table.

4. The method according to claim 3, wherein the determining the second K1 set in the second scheduling method based on the first K1 set in the first scheduling method, the K0 set in the second scheduling method, and an HARQ feedback bundling value N comprises:

determining the second K1 set based on a formula as follows:

$$\{K1'\} = \{K1\} \bigcup \{k1_i + k0_{r,m} - \min\{S_r\}\}_{i=0,r=0,m=0}^{i=L-1,r=R-1,m=T_r-1}, \text{ wherein}$$

$\{K1'\}$ is the second K1 set, $\{K1\}$ is the first K1 set, $k1_i$ is an ith k1 value comprised in the first K1 set $\{K1\}$, $k0_{r,m}$ is an mth k0 value in $\{S_r\}$, $\{S_r\}$ is a subset of $\{P_r\}$, $\{P_r\}$ is a set of k0 values comprised in the rth element of the elements comprising the plurality of k0 values in the TDRA table, $T_r$ is a number of k0 values comprised in $\{S_r\}$, a value of $T_r$ is a minimum value of $M_r$ and N, $M_r$ is a number of k0 values comprised in $\{P_r\}$, min $\{S_r\}$, is a minimum k0 value in $\{S_r\}$, and $\bigcup$ represents computation of a union set.

5. The method according to claim 3, wherein the determining the second K1 set in the second scheduling method based on the first K1 set in the first scheduling method, the K0 set in the second scheduling method, and an HARQ feedback bundling value N comprises:

determining a third K1 set as the first K1 set, a value of i as 0, a value of r as 0 and a value of m as 0, executing an incremental loop based on i, r and m cyclically, and taking the third K1 set as the second K1 set after loop end conditions are satisfied; wherein contents executed in the incremental loop based on i, r and m comprise: determining a union set of the third K1 set and a combination value, and determining the union set as the third K1 set;

the combination value is $k1_i + k0_{r,m} - \min \{S_r\}$; $\{S_r\}$ is a subset of $\{P_r\}$, $\{P_r\}$ is a set of k0 values comprised in the rth element of the elements comprising the plurality of k0 values in the TDRA table, $T_r$ is a number of k0 values comprised in $\{S_r\}$, a value of $T_r$ is a minimum value of $M_r$ and N, $M_r$ is a number of k0 values comprised in $\{P_r\}$; min $\{S_r\}$ is a minimum k0 value in $\{S_r\}$; and the loop end conditions are that the value of i is L−1, the value of r is R−1, and the value of m is $T_r$−1; the loop end conditions are that the value of i reaches L−1, the value of r reaches R−1, and the value of m reaches $T_r$; and L is a number of k1 values comprised in the first K1 set, and R is a number of elements comprising the plurality of k0 values in the TDRA table.

6. The method according to claim 3, wherein the determining the second K1 set in the second scheduling method based on the first K1 set in the first scheduling method, the K0 set in the second scheduling method, and an HARQ feedback bundling value N comprises:

determining a fourth K1 set based on a fourth K1 set initially set as an empty set and two formulas as follows: wherein $$\{K1'\} = \{K1'\} \bigcup \{k1_i + k0_{r,m} - \min\{S_r\}\}_{i=0,r=0,m=0}^{i=L-1,r=R-1,m=T_r-1}$$

$$\{K1''\} = \{K1\} \bigcup \{K1'\}$$

$\{K1''\}$ is the second K1 set, $\{K1'\}$ is the fourth K1 set, $\{K1\}$ is the first K1 set, $k1_i$ is an ith k1 value comprised in the first K1 set $\{K1\}$, $k0_{r,m}$ is an mth k0 value in $\{S_r\}$, $\{S_r\}$ is a subset of $\{P_r\}$, $\{P_r\}$ is a set of k0 values comprised in the rth element of the elements comprising the plurality of k0 values in the TDRA table, $T_r$ is a number of k0 values comprised in $\{S_r\}$, a value of $T_r$ is a minimum value of $M_r$ and N, $M_r$ is a number of k0 values comprised in $\{P_r\}$ min $\{S_r\}$ is a minimum k0 value in $\{S_r\}$, and $\bigcup$ represents computation of a union set.

7. The method according to claim 3, wherein the determining the second K1 set in the second scheduling method based on the first K1 set in the first scheduling method, the K0 set in the second scheduling method, and an HARQ feedback bundling value N comprises:

determining a fourth K1 set in the second scheduling method based on the first K1 set in the first scheduling method, the K0 set in the second scheduling method, and the HARQ feedback bundling value N; and determining a union set of the fourth K1 set and the first K1 set as the second K1 set; wherein the determining the fourth K1 set in the second scheduling method based on the first K1 set in the first scheduling method, the K0 set in the second scheduling method, and the HARQ feedback bundling value N comprises:

determining the fourth K1 set as an empty set, a value of i as 0, a value of r as 0 and a value of m as 0, and executing an incremental loop based on i, r and m cyclically until loop end conditions are satisfied; wherein contents executed in the incremental loop based on i, r and m comprise: determining a union set of the fourth K1 set and a combination value, and determining the union set as the fourth K1 set;

the combination value is $k1_i + k0_{r,m} - \min \{S_r\}$; $\{S_r\}$ is a subset of $\{P_r\}$, $\{P_r\}$ is a set of k0 values comprised in the rth element of the elements comprising the plurality of k0 values in the TDRA table, $T_r$ is a number of k0 values comprised in $\{S_r\}$, a value of $T_r$ is less than or equal to N, and $\min \{S_r\}$ is a minimum k0 value in $\{S_r\}$; and the loop end conditions are that the value of i is L−1, the value of r is R−1, and the value of m is $T_r$−1; the loop end conditions are that the value of i reaches L−1, the value of r reaches R−1, and the value of m reaches $T_r$; and L is a number of k1 values comprised in the first K1 set, and R is a number of elements comprising a plurality of k0 values in the TDRA table.

8. The method according to claim 7, further comprising:

selecting N k0 values from $\{P_r\}$ as $\{S_r\}$ if the number of the k0 values comprised in $\{P_r\}$ is greater than N; and taking $\{P_r\}$ as $\{S_r\}$ if the number of the K0 values comprised in $\{P_r\}$ is less than or equal to N;

wherein the selecting N k0 values from $\{P_r\}$ comprises one of the following:

selecting N k0 values having maximum values from $\{P_r\}$;

selecting k0 values corresponding to N PDSCHs at last time positions among a plurality of PDSCHs scheduled by the same DCI; and selecting a k0 value corresponding to one PDSCH at a last time position among a plurality of PDSCHs scheduled by the same DCI, and any other N−1 k0 values from the PDSCHs.

9. The method according to claim 1, further comprising:

determining a feedback window for the HARQ-ACK codebook based on the second K1 set; and feeding back the HARQ-ACK codebook based on the feedback window.

10. The method according to claim 1, further comprising:

receiving first configuration information from the network device, wherein the first configuration information comprises information configured to indicate the first K1 set in the first scheduling method; or determining the first K1 set in the first scheduling method based on a communication protocol.

11. The method according to claim 1, further comprising:

receiving the second configuration information from the network device, wherein the second configuration information comprises information configured to indicate the K0 set in the second scheduling method;

wherein the second configuration information comprises a TDRA table, and the TDRA table comprises the K0 set in the second scheduling method.

12. The method according to claim 1, further comprising:

receiving third configuration information from the network device, wherein the third configuration information comprises information configured to indicate the HARQ feedback bundling value N, or determining the HARQ feedback bundling value N based on a communication protocol.

13. A method for determining a HARQ-ACK codebook, performed by a network device and comprising:

transmitting second configuration information to user equipment, wherein the second configuration information comprises information configured to indicate a K0 set in a second scheduling method; determining a second K1 set in the second scheduling method based on a first K1 set in a first scheduling method, the K0 set in the second scheduling method, and an HARQ feedback bundling value N; and determining the HARQ-ACK codebook based on the second K1 set; wherein a k1 value in the first K1 set is configured to indicate a number of time units offset from a time unit in which a PDSCH is located to a time unit in which an uplink channel of an HARQ-ACK corresponding to the PDSCH is located; a k0 value in the K0 set is configured to indicate a number of time units offset from a time unit in which the PDSCH is located to a time unit in which an uplink control channel corresponding to the PDSCH is located; and in the first scheduling method, one piece of DCI schedules one PDSCH; and in the second scheduling method, one piece of DCI schedules a plurality of PDSCHs.

14. The method according to claim 13, wherein the second configuration information comprises a TDRA table, and the TDRA table comprises the K0 set in the second scheduling method.

15. The method according to claim 13, further comprising:

transmitting first configuration information to the user equipment, wherein the first configuration information comprises information configured to indicate the first K1 set in the first scheduling method.

16. The method according to claim 13, wherein transmitting third configuration information to the user equipment, wherein the third configuration information comprises information configured to indicate the HARQ feedback bundling value N.

17. A method for decoding a HARQ-ACK codebook, performed by a network device and comprising:

receiving the HARQ-ACK codebook from user equipment;

determining a second K1 set in a second scheduling method based on a first K1 set in a first scheduling method, a K0 set in the second scheduling method, and an HARQ feedback bundling value N; and decoding the HARQ-ACK codebook based on the second K1 set; wherein a k1 value in the first K1 set is configured to indicate a number of time units offset from a time unit in which a PDSCH is located to a time unit in which an uplink channel of an HARQ-ACK corresponding to the PDSCH is located; a k0 value in the K0 set is configured to indicate a number of time units offset from a time unit in which the PDSCH is located to a time unit in which an uplink control channel corresponding to the PDSCH is located; in the first scheduling method, one piece of DCI schedules one PDSCH; and in the second scheduling method, one piece of DCI schedules a plurality of PDSCHs.

18. A communication apparatus, comprising one or more processors and a memory; wherein the memory is configured to store a computer program; and

the one or more processors are collectively configured to execute the computer program, so as to implement the method according to claim 1.

19. A communication apparatus, comprising one or more processors and a memory; wherein the memory is configured to store a computer program; and the one or more processors are collectively configured to execute the computer program, so as to implement the method according to claim 13.

20. A communication apparatus, comprising one or more processors and a memory; wherein the memory is config- ured to store a computer program; and the one or more processors are collectively configured to execute the computer program, so as to implement the method according to claim 17.

\* \* \* \* \*

32